United States Patent
Funahashi

(10) Patent No.: US 12,482,584 B2
(45) Date of Patent: Nov. 25, 2025

(54) COMPOSITE, AND STRUCTURE AND THERMISTOR USING THE SAME

(71) Applicant: Murata Manufacturing Co., Ltd., Nagaokakyo (JP)

(72) Inventor: Shuichi Funahashi, Nagaokakyo (JP)

(73) Assignee: MURATA MANUFACTURING CO., LTD., Nagaokakyo (JP)

( * ) Notice: Subject to any disclaimer, the term of this patent is extended or adjusted under 35 U.S.C. 154(b) by 1074 days.

(21) Appl. No.: 17/237,456

(22) Filed: Apr. 22, 2021

(65) Prior Publication Data

US 2021/0241946 A1 Aug. 5, 2021

Related U.S. Application Data

(63) Continuation of application No. PCT/JP2019/049356, filed on Dec. 17, 2019.

(30) Foreign Application Priority Data

Dec. 28, 2018 (JP) .................................. 2018-248102

(51) Int. Cl.
  *H01C 7/04* (2006.01)
  *G05D 23/24* (2006.01)

(52) U.S. Cl.
  CPC .............. *H01C 7/049* (2013.01); *G05D 23/24* (2013.01)

(58) Field of Classification Search
  CPC ........... H01C 7/049; G05D 23/24; B22F 7/00; B22F 1/00; B32B 18/00; H01M 4/62; H01H 85/06; H01H 85/143

USPC ......................................................... 338/22 R
  See application file for complete search history.

(56) References Cited

U.S. PATENT DOCUMENTS

| | | | |
|---|---|---|---|
| 4,808,326 A * | 2/1989 | Tanino | H01F 1/37 428/407 |
| 6,329,058 B1 * | 12/2001 | Arney | C09C 1/3684 428/405 |
| 9,659,691 B2 | 5/2017 | Ito et al. | |
| 9,840,787 B2 * | 12/2017 | Kitada | H01C 7/042 |
| 9,905,341 B2 | 2/2018 | Fujita et al. | |
| 10,263,235 B2 * | 4/2019 | Okuno | H01M 50/451 |
| 11,607,728 B2 * | 3/2023 | Funahashi | C04B 35/2666 |
| 2009/0165289 A1 | 7/2009 | Deng et al. | |
| 2013/0244109 A1 * | 9/2013 | Sabi | H01M 4/131 |
| 2015/0036723 A1 | 2/2015 | Fujita et al. | |

(Continued)

FOREIGN PATENT DOCUMENTS

| EP | 0225392 A1 | 6/1987 |
|---|---|---|
| JP | 2000049004 A | 2/2000 |

(Continued)

OTHER PUBLICATIONS

Written Opinion of the International Search Authority issued for PCT/JP2019/049356, date of mailing Mar. 10, 2020.

(Continued)

*Primary Examiner* — Kyung S Lee
(74) *Attorney, Agent, or Firm* — ArentFox Schiff LLP

(57) ABSTRACT

A composite that includes multiple first metal oxide particles containing at least one metal element that is at least one of Mn or Ni, and a first amorphous phase between the multiple first metal oxide particles and which contains the at least one first metal element.

20 Claims, 12 Drawing Sheets

(56) References Cited

U.S. PATENT DOCUMENTS

| | | | |
|---|---|---|---|
| 2015/0170805 A1* | 6/2015 | Ito ..................... | H01C 17/075 |
| | | | 148/537 |
| 2016/0211059 A1 | 7/2016 | Fujita et al. | |
| 2017/0088471 A1 | 3/2017 | Randall et al. | |
| 2018/0315575 A1 | 11/2018 | Tsang et al. | |
| 2019/0260018 A1* | 8/2019 | Matsuyama ...... | H01M 10/0525 |
| 2020/0139441 A1 | 5/2020 | Funahashi | |
| 2020/0139442 A1 | 5/2020 | Funahashi | |

FOREIGN PATENT DOCUMENTS

| | | | |
|---|---|---|---|
| JP | 2008244344 A | 10/2008 | |
| JP | 2013179161 A | 9/2013 | |
| JP | 2015065417 A | 4/2015 | |
| WO | 2014010591 A1 | 1/2014 | |
| WO | 2019008711 A1 | 1/2019 | |
| WO | 2019009320 A1 | 1/2019 | |

OTHER PUBLICATIONS

International Search Report issued for PCT/JP2019/049356, date of mailing Mar. 10, 2020.

* cited by examiner

COMPOSITE, AND STRUCTURE AND THERMISTOR USING THE SAME

CROSS REFERENCE TO RELATED APPLICATIONS

The present application is a continuation of International application No. PCT/JP2019/049356, filed Dec. 17, 2019, which claims priority to Japanese Patent Application No. 2018-248102, filed Dec. 28, 2018, the entire contents of each of which are incorporated herein by reference.

FIELD OF THE INVENTION

The present invention relates to a composite, a metal oxide composite to be more exact, and to a structure and a thermistor made using this composite.

BACKGROUND OF THE INVENTION

Thin-film thermistors using a large negative temperature coefficient (NTC) metal oxide film as their thermistor layer are enjoying a widespread use, for example as temperature sensors, in different equipment and devices. A thin-film thermistor is produced typically by forming metal electrodes on a substrate and then forming a sintered layer of metal oxide particles, as a metal oxide film that functions as the thermistor layer, in contact with the metal electrodes on the substrate.

Such a production method has the disadvantage that weak bonding between the metal oxide film and the metal electrodes can result in interfacial detachment. This disadvantage, the inventor believes, is caused by sintering metal oxide particles by heating at 400° C. or above in order to form a metal oxide film that exhibits high thermistor properties. This high-temperature sintering causes cracks or interfacial detachment between the metal oxide film and the metal electrodes because of a difference in thermal expansion coefficient therebetween. To address this disadvantage, measures have been proposed with the aim of combining high thermistor properties and strong bonding (e.g., see Patent Documents 1 to 4).

Patent Document 1: International Publication No. 2014/010591
Patent Document 2: Japanese Unexamined Patent Application Publication No. 2008-244344
Patent Document 3: Japanese Unexamined Patent Application Publication No. 2015-065417
Patent Document 4: Japanese Unexamined Patent Application Publication No. 2013-179161
Patent Document 5: U.S. Patent Application Publication No. 2017/0088471

SUMMARY OF THE INVENTION

The known measures, however, are not necessarily fully satisfactory for the production of a thin-film thermistor that combines desired electrical characteristics (e.g., high thermistor properties) and strong bonding.

Methods commonly known for the formation of a metal oxide film on kinds of substrates include the solution process, the gas-phase process, etc. When performed at low temperatures at which a metal or resin substrate is not affected, however, these processes only give a low-quality metal oxide film, failing to achieve the desired electrical characteristics. Technologies for solidification at room temperature, such as aerosol deposition, are also known, but these are unsuitable for mass production because of slow film formation. Adding $SiO_2$ glass to the metal oxide to make it sinterable at low temperatures affects electrical characteristics because the $SiO_2$ causes a resistance increase. The use of a nitride enables sputtering at room temperature, but nitrides are disadvantageous in terms of stability in the air. Sputtering, furthermore, has the drawback of low bonding strength because of the nature of the process itself.

Under such circumstances, cold sintering (CS), by which metal oxide particles can be sintered at as low temperatures as 200° C. or below, was developed in recent years (see Patent Document 5). In this process of cold sintering, metal oxide particles are mixed with solvents that can partially dissolve the oxide (water and an acid or alkali), and the resulting mixture is heated and pressed at 200° C. or below. This, reportedly, can give a sintered mass having a density of 85% or more of its theoretical density. This process of cold sintering, however, causes another problem: With particles of Mn and/or Ni oxide(s), it fails to give a high-density sintered mass (metal oxide film), and the sintered mass itself is not sufficiently strong either.

To address these known problems, the inventor carried out extensive research in order to find an original way to combine metal oxide particles with another material. An object of the present invention is to realize a novel composite containing multiple particles of a metal oxide (herein also referred to as "metal oxide composite") in which the metal element(s) in the metal oxide includes at least one of Mn or Ni and that is strong in itself. Another object of the present invention is to provide a structure made using such a composite in which the composite is bonded firmly to a metal component. Yet another object of the present invention is to provide a thermistor made using such a structure that can combine desired electrical characteristics and strong bonding.

A first aspect of the present invention provides a composite that includes: a plurality of first metal oxide particles containing at least one first metal element that is at least one of Mn or Ni; and a first amorphous phase between the plurality of first metal oxide particles and contains the at least one first metal element.

In the first aspect of the present invention, the first metal element can further include at least one selected from the group consisting of Fe, Al, Co, and Cu.

In the first aspect of the present invention, the composite can further include a plurality of first resin particles, and the first amorphous phase can be present between the plurality of first metal oxide particles and the plurality of first resin particles.

In the first aspect of the present invention, the first resin particles can comprise at least one selected from the group consisting of polyethylene terephthalate, polyetherimide, polyamide-imides, polyimides, polytetrafluoroethylene, epoxy resins, and liquid crystal polymers.

In the first aspect of the present invention, the first amorphous phase can have a thickness of 100 μm or less.

In the first aspect of the present invention, at least some of the plurality of first metal oxide particles can be in direct contact with each other.

A second aspect of the present invention provides a composite that includes: a plurality of first metal oxide particles that are in direct contact with each other, the plurality of first metal oxide particles containing at least one first metal element that is at least one of Mn or Ni; a plurality of first resin particles inside the plurality of first metal oxide particles that are in direct contact with each other; and a first amorphous phase between the plurality of first metal oxide particles that are in direct contact with each other and the first resin particles, the first amorphous phase containing the at least one first metal element.

In the second aspect of the present invention, the first metal element can further include at least one selected from the group consisting of Fe, Al, Co, and Cu.

In the second aspect of the present invention, the plurality of first resin particles can comprise at least one selected from the group consisting of polyethylene terephthalate, polyetherimide, polyamide-imides, polyimides, polytetrafluoroethylene, epoxy resins, and liquid crystal polymers.

In the second aspect of the present invention, the first amorphous phase can have a thickness of 100 µm or less.

A third aspect of the present invention provides a structure that includes: a metal component that contains at least one second metal element; a composite according to the present invention as described above; and a bonding layer between the metal component and the composite that includes a second amorphous phase that contains the at least one first metal element and the at least one second metal element.

In the third aspect of the present invention, the second metal element can include at least one selected from the group consisting of Mn, Ni, Fe, Al, Zn, Cr, Ti, Co, Cu, Ag, Au, and Pt.

A fourth aspect of the present invention provides a thermistor that includes: a resin substrate made of at least one second resin; and a structure according to the present invention as described above on the resin substrate, and wherein the metal component includes two metal electrodes.

In the fourth aspect of the present invention, the composite and the bonding layer can have a combined thickness of 100 µm or less.

In the fourth aspect of the present invention, the second resin can include at least one selected from the group consisting of polyethylene terephthalate, polyetherimide, polyamide-imides, polyimides, polytetrafluoroethylene, epoxy resins, and liquid crystal polymers.

In the fourth aspect of the present invention, each of the two metal electrodes can have a respective primary surface that face each other, and the composite can be interposed between the respective primary surfaces.

In an aspect of the present invention, the two metal electrodes can be electrically coupled, respectively, to two outer electrodes that are positioned opposite to each other in a plan view of the thermistor.

According to the present invention, a novel metal oxide composite is realized in which the metal element(s) in the metal oxide includes at least one of Mn or Ni and that is dense and strong in itself. The present invention also realizes a composite that changes its resistivity only to a small extent when left under hot and humid conditions. The present invention, furthermore, provides a structure made using such a composite in which the composite is bonded firmly to a metal component. In addition, the present invention provides a thermistor made using such a structure that can combine desired electrical characteristics and strong bonding.

BRIEF DESCRIPTION OF THE DRAWINGS

FIG. 4(a) is a schematic cross-sectional view along line X-X in FIG. 4(b). FIG. 4(b) is a schematic top view.

FIG. 5(a) is a schematic cross-sectional view along line X-X in FIG. 5(b). FIG. 5(b) is a schematic top view.

FIG. 6(a) is a schematic cross-sectional view along line X-X in FIG. 6(b). FIG. 6(b) is schematic top view excluding the resin substrate in an upper position in FIG. 6(a).

FIG. 7(a) is a schematic cross-sectional view along line X-X in FIG. 7(b). FIG. 7(b) is a schematic top view excluding the resin substrate in an upper position in FIG. 7(a).

FIG. 8(a) is a schematic cross-sectional view along line X-X in FIG. 8 (b). FIG. 8(b) is a schematic top view.

FIG. 9(a) is a schematic cross-sectional view along line X-X in FIG. 9(b). FIG. 9(b) A schematic top view.

FIG. 13(a) is a STEM image of a cross-section of the joint between a metal oxide composite layer and a lower electrode including its vicinity. FIG. 13(b) is an elemental distribution of C (carbon) in FIG. 13(a). FIG. 13(c) is an elemental distribution of Mn (manganese) in FIG. 13(a). FIG. 13(d) is an elemental distribution of Cu (copper) in FIG. 13 (a).

FIG. 14(a) is a STEM image of a cross-section of the joint between a metal oxide composite layer and a lower electrode including its vicinity. FIG. 14(b) is an elemental distribution of C (carbon) in FIG. 13(a). FIG. 14(c) is an elemental distribution of Mn (manganese) in FIG. 14(a). FIG. 14(d) is an elemental distribution of Cu (copper) in FIG. 14 (a).

FIG. 15(a) is a TEM image of a cross-section of a metal oxide composite layer. FIG. 15(b) is an enlarged view of the framed region in FIG. 15(a). FIG. 15(c) is an enlarged view of the framed region in FIG. 15(b). FIG. 15(d) is an example of an electron-beam diffraction pattern from an amorphous phase, given to make the amorphous phase distinguishable from crystalline particles.

DETAILED DESCRIPTION OF THE PREFERRED EMBODIMENTS

Figure 1:
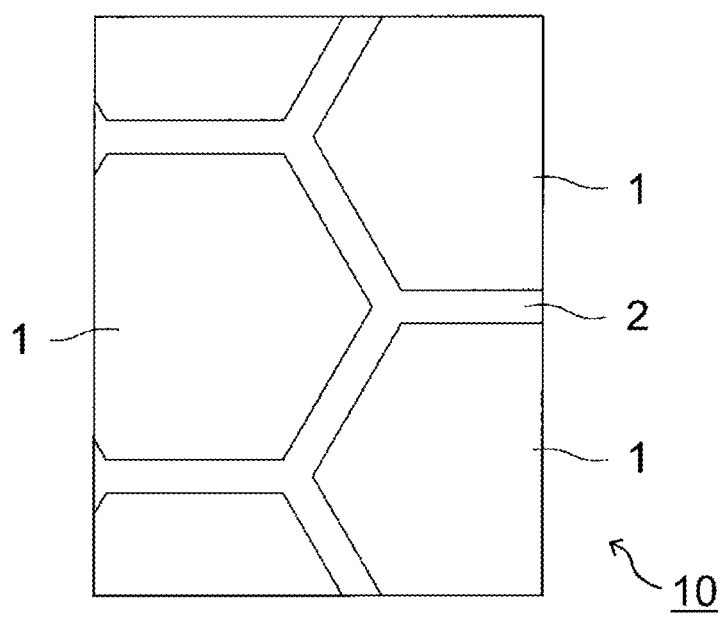
FIG. 1 is a partial schematic diagram illustrating the structure of a composite according to an embodiment of the present invention.

The following describes composites, and also structures and thermistors made using the composites, according to two embodiments of the present invention with reference to drawings. In the drawings, like elements are designated by like numerals. The same description applies to elements given the same numeral unless stated otherwise.

Embodiment 1

As illustrated in FIG. 1, a composite (metal oxide composite) 10 according to this embodiment includes: multiple first metal oxide particles 1 containing at least one first metal element (hereinafter also referred to simply as "metal oxide particles"); and a first amorphous phase 2 between the multiple first metal oxide particles 1.

The metal oxide forming the metal oxide particles 1 contains, as the first metal element, at least one of Mn or Ni and may further contain at least one selected from the group consisting of Fe, Al, Co, and Cu. The Mn and/or Ni is essential metal element(s) in the metal oxide. The at least one selected from the group consisting of Fe, Al, Co, and Cu is an optional metal element(s) in the metal oxide. Preferably, the optional metal element(s) is at least one selected from the group consisting of Fe, Al, and Co. Such metal oxides can all be metal oxide semiconductors and can have the spinel structure in particular, but the metal oxide used in this embodiment does not need to be so.

The overall proportion(s) of the metal element(s) in the metal oxide forming the multiple metal oxide particles 1 is not critical, and suitable proportion(s) can be selected according to, for example, the desired electrical characteristics. For the essential metal element(s), the Mn:Ni proportions (atomic ratio) can be, for example, 1:1 to 100:1 if both Mn and Ni are present. If there is optional metal element(s), its/their abundance (total if more than one is present) only needs to be smaller than that of the essential metal element(s) (combined if both Mn and Ni are present). For example, the essential metal element(s):optional metal element(s) proportions (atomic ratio) can be 1:1 to 100:1.

The average diameter of the metal oxide particles 1 can be 0.01 μm to 100 μm for example and can be 0.02 μm to and 1 μm in particular. Ensuring that the average diameter of the metal oxide particles 1 is in the range of 0.01 μm to 100 μm leads to efficient transport of metal oxide particles into spaces between others by a metal acetylacetonate-derived liquid medium and/or a fluid (preferably, a solvent) in the production method described later in this embodiment, thereby helping densify the resulting composite more effectively. As mentioned herein, the average diameter of particles is based on the size distribution of the particles by volume. When a cumulative curve is plotted with the total volume as 100%, the diameter at which the cumulative volume is 50% (D50) is the average diameter of the particles. Such an average diameter can be measured using a laser diffraction/scattering particle size analyzer or scanning electron microscope.

The metal oxide particles 1 may be a mixture of two or more kinds of metal oxide particles with different metal oxide compositions and/or average diameters.

The first amorphous phase 2 is between the metal oxide particles 1 and can stick the metal oxide particles 1 together. By virtue of this, the composite 10 according to this embodiment is strong in itself. Although not limiting this embodiment, a structure is possible in which multiple metal oxide particles 1 may be dispersed in a continuous first amorphous phase 2. Owing to the first amorphous phase 2, furthermore, the composite 10 according to this embodiment is able to contain metal oxide particles 1 densely (able to have electrically conductive paths created by densely dispersed metal oxide particles 1). In addition, the first amorphous phase 2 can exhibit electrical characteristics close to those of the crystalline metal oxide (semiconductor) particles 1. The resulting electrical characteristics are therefore comparable to those of a sintered mass of metal oxide particles produced by the known and commonly used method of sintering at high temperatures.

The first amorphous phase 2 contains metal element(s) of the same kind(s) as the first metal element in the metal oxide particles 1. By virtue of this, the composite 10 is effectively prevented from becoming electrically degraded even if the metal oxide particles 1 and the first amorphous phase 2 diffuse into each other.

As mentioned herein, an amorphous phase represents a phase having substantially no crystallinity or only having a relatively small degree of crystallinity. An amorphous phase can be distinguished from crystalline particles on the basis of electron-beam diffraction patterns, a technique known to those skilled in the art. What element(s) (metal element(s) in particular) the amorphous phase contains can be determined using a scanning transmission electron microscope (STEM).

In this embodiment, the presence of the first amorphous phase 2 between the metal oxide particles 1 can mean that the space between the multiple metal oxide particles 1 is filled with the first amorphous phase 2. Any void that may be contained in the composite 10 is therefore eliminated by being filled with the first amorphous phase 2, and this helps reduce the change in resistance that occurs when the composite 10 is left under hot and humid conditions, an event seemingly caused by the presence of voids. When focus is on any adjacent two of all metal oxide particles 1, there may be an amount of first amorphous phase 2 between these two metal oxide particles 1, or, alternatively, the two metal oxide particles 1 may be in contact with (preferably, bound to) each other with substantially no first amorphous phase 2 therebetween. In the former case, the first amorphous phase 2 can have a thickness of 100 μm or less. For electrical characteristics and/or strength purposes, smaller thickness of the first amorphous phase 2 is preferred. In the latter of the cases, the composite 10 may have a portion substantially free of first amorphous phase 2.

It should be noted that the composite 10 (the first amorphous phase 2 in particular) according to this embodiment is substantially free of silicon oxides, such as $SiO_2$ glass. Silicon oxides are unfavorable because they affect electrical characteristics significantly. The silicon oxide content of the composite 10 (based on the total mass of the metal oxide particles) is 0.1% by mass or less for example, preferably 0.01% by mass or less, more preferably substantially zero % by mass.

The composite 10 according to this embodiment is able to be part of a structure by being placed (formed as a film in particular) on any physical object. Although not limiting this embodiment, the composite 10 can be bonded at least in part to a metal component (e.g., a structural element, region of something, etc., made of metal).

Figure 2:
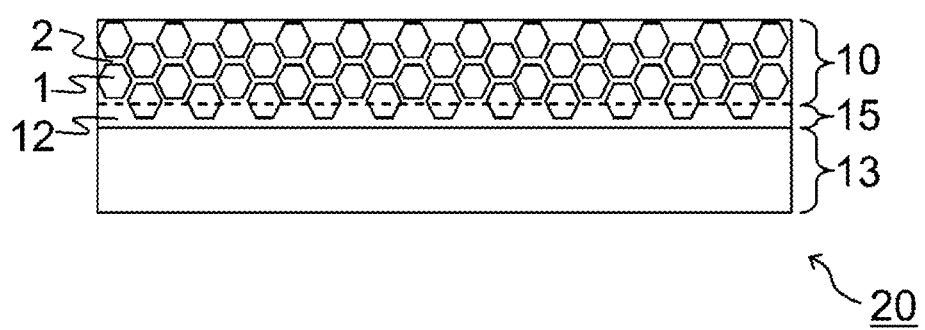
FIG. 2 is a schematic cross-sectional diagram illustrating an example of a structure according to an embodiment of the present invention.

For example, as illustrated in FIG. 2, a structure 20 according to an example of this embodiment includes: a metal component 13 that contains at least one second metal element; a composite 10 according to this embodiment as described above; and a bonding layer 15 between the metal component 13 and the composite 10. In reality, the boundary between the composite 10 and the bonding layer 15 does not need to be clear (in the attached drawings, imaginary boundaries are indicated by dotted lines). For the structure 20, there may be a way of understanding in which the composite 10 and the bonding layer 15 collectively form the metal oxide composite layer or thermistor layer.

The bonding layer 15 includes a second amorphous phase 12. The second amorphous phase 12 can stick the composite 10 to the metal component 13. By virtue of this, the structure 20 according to this embodiment achieves strong bonding of a composite 10 therein to its metal component 13.

In the composite 10 according to this embodiment, furthermore, the second amorphous phase 12 contains metal element(s) of the same kind(s) as the first and second metal elements. The second amorphous phase 12 can exhibit electrical characteristics close to those of the crystalline metal oxide (semiconductor) particles 1. Since the second amorphous phase 12 contains metal element(s) of the same kind(s) as the first and second metal elements, furthermore, the electrical resistance between the composite 10, the bonding layer 15, and the metal component 13 (to put it simply, the Schottky barrier between the metal oxide (semiconductor) particles 1 and the metal component 13, or to be more exact, the interfacial resistance between the metal oxide particles 1 and the second amorphous phase 12 and between the second amorphous phase 12 and the metal component 13) is lowered, helping improve the electrical characteristics of the structure 20.

Although not limiting this embodiment, the second and first amorphous phases 12 and 2 may be continuous (e.g., creating gradations and/or intermingled in the intermediate region). If this is the case, the distribution of the first and second metal elements that can be present in the amorphous phases, for example, may provide the basis for determining their boundary.

The second metal element, a constituent of the metal component 13, can be of any kind but may include at least one selected from the group consisting of Mn, Ni, Fe, Al, Zn, Cr, Ti, Co, Cu, Ag, Au, and Pt. The second metal element is any of these or an alloy of two or more of these, preferably any of Ni, Cu, or Ag or an alloy of two or more of these. The second metal element may be metal(s) commonly used as electrodes. Additionally/Alternatively, the second metal element may be metal element(s) of the same kind(s) as or different from the first metal element.

Figure 3:
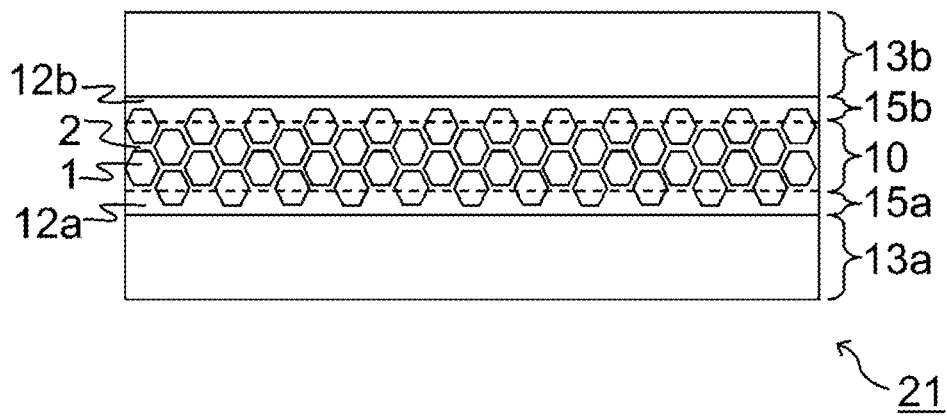
FIG. 3 is a schematic cross-sectional diagram illustrating another example of a structure according to an embodiment of the present invention.

To take another example, as illustrated in FIG. 3, a structure 21 according to another example of this embodiment may have a composite 10 according to this embodiment as described above bonded to metal components 13a and 13b by bonding layers 15a and 15b, respectively, interposed therebetween. For the structure 21, there may be a way of understanding in which the composite 10 and the bonding layers 15a and 15b collectively form the metal oxide composite layer or thermistor layer.

The advantages of such a structure 21 are the same as those described above in relation to the structure 20. In addition to this, the structure 21 allows its metal components 13 and 13b to be used as opposite electrodes, and, if they are, the electrical characteristics (e.g., variations in resistance) of the structure 21 can be controlled effectively by controlling the total thickness of the composite 10 and bonding layers 15a and 15b (thickness of the metal oxide composite layer).

The structures 20 and 21 according to this embodiment are able to be part of a thermistor by being placed on any substrate, optionally with modifications. Although not limiting this embodiment, the structures 20 and 21 can be placed on a resin substrate (or resin film), optionally with modifications.

Figure 4A:
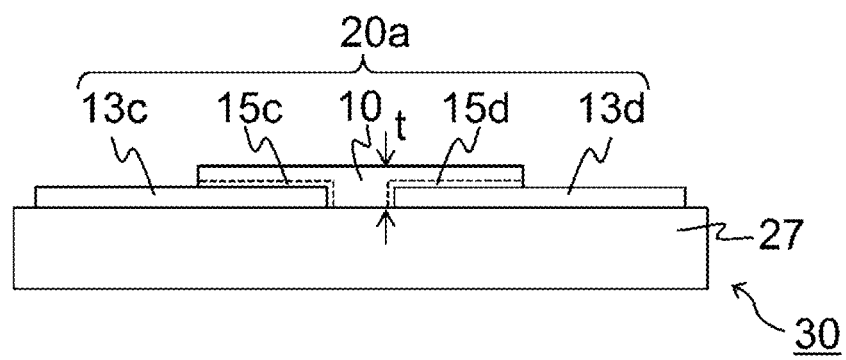
FIGS. 4(a) and 4(b) are diagrams illustrating an example of a thermistor according to an embodiment of the present invention.
Figure 4B:
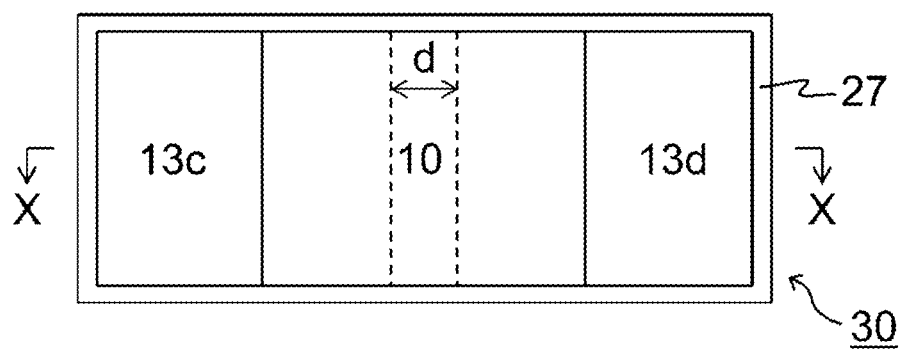

For example, as illustrated in FIGS. 4(a) and 4(b), a thermistor 30 according to an example of this embodiment includes: a resin substrate 27 made of at least one second resin; and a structure 20a according to this embodiment on the resin substrate 27. The metal component 13 of the structure 20a includes two metal electrodes 13c and 13d, and there are bonding layers 15c and 15d, respectively, between them and the composite 10. Of the components of the structure 20a, this thermistor 30 has the metal electrodes 13c and 13d closer to the resin substrate 27 than it has the composite 10, but this is not the only possible arrangement in this embodiment. The exposed portions of the composite 10 and bonding layers 15c and 15d may optionally be protected with a protective film (not illustrated), for example of resin.

The composite 10 and the bonding layers 15c and 15d interposed between the metal electrodes 13c and 13d are able to function as a thermistor layer, a layer whose resistance can change according to temperature (to be more exact, having a negative temperature coefficient). It should be noted that in FIG. 4(b), the metal electrodes 13c and 13d located under the composite 10 are seen through the composite 10.

The thermistor 30 according to this embodiment can achieve its desired electrical characteristics (e.g., thermistor properties, or to be more exact, resistivity at room temperature, B-constant, etc.). The composite 10 is able to densely contain the metal oxide particles 1 by virtue of the first amorphous phase 2, and the first and second amorphous phases 2 and 12 can exhibit electrical characteristics close to those of the crystalline metal oxide (semiconductor) particles 1. The resulting electrical characteristics are therefore comparable to those of a sintered mass of metal oxide particles produced by the known and commonly used method of sintering at high temperatures. The thermistor 30 according to this embodiment, furthermore, can achieve strong bonding because the composite 10 is bonded firmly to the metal electrodes 13c and 13d by the bonding layers 15c and 15d interposed therebetween. In addition, the thermistor 30 can be highly reliable because the strong bonding helps reduce variations in resistance.

For such a thermistor 30, the total thickness of the composite 10 and bonding layers 15c and 15d on the resin substrate 27 (thickness of the metal oxide composite layer that can function as the thermistor layer) can be 100 μm or less for example and can be 1 μm to 30 μm to be more exact. Such a thermistor 30 is also referred to as a thin-film thermistor.

By virtue of being thin like this, the thermistor 30 easily fits even into a limited space. The thinness also helps reduce the pressure-induced physical damage, to both the thermistor 30 and the subject to which it is attached, that occurs when the thermistor 30 is attached or operated. Such a thermistor 30, furthermore, is highly temperature-sensitive owing to its small thermal capacity. In addition, the thinness and flexibility of the composite 10 (and the bonding layers 15c and 15d) reduce the risk of fracture after deformation. In particular, if the resin substrate 27 is a flexible substrate (or film), the resulting thermistor 30 is flexible as a whole.

The second resin, which forms the resin substrate 27, can be of any kind. For example, the second resin may include at least one selected from the group consisting of polyethylene terephthalate, polyetherimide, polyamide-imides, polyimides, polytetrafluoroethylene, epoxy resins, and liquid crystal polymers (LCPs). Of these, polyimides and polyamide-imides are particularly preferred in terms of heat resistance and adhesiveness.

The thickness of the resin substrate 27 is not critical. For thin-film thermistors, it can be between 1 and 50 μm for example.

Figure 5A:
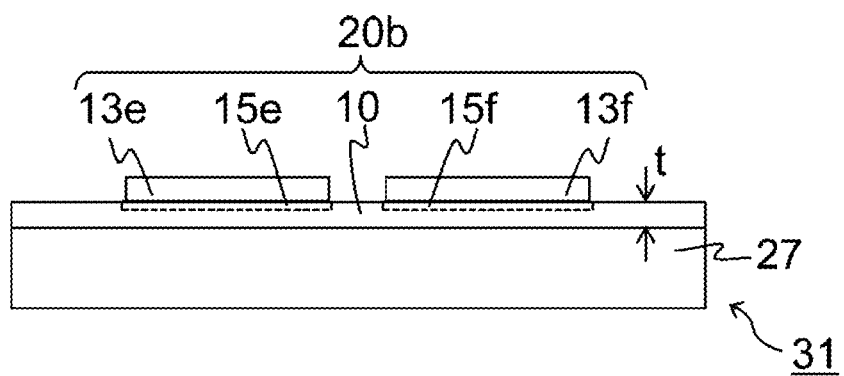
FIGS. 5(a) and 5(b) are diagrams illustrating another example of a thermistor according to an embodiment of the present invention.
Figure 5B:
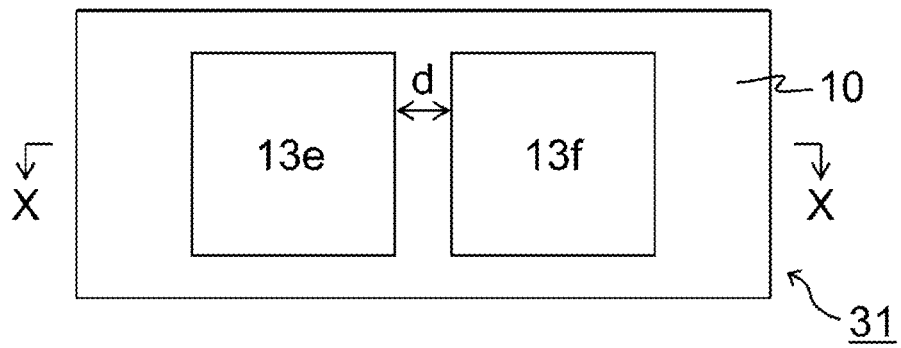

The thermistor 30 according to this embodiment can be modified in various ways. For example, as illustrated in FIGS. 5(a) and 5(b), a thermistor 31 includes: a resin substrate 27 made of at least one second resin; and a structure 20b according to this embodiment on the resin substrate 27. The metal component 13 of the structure 20b includes two metal electrodes 13e and 13f, and there are bonding layers 15e and 15f, respectively, between them and the composite 10. Of the components of the structure 20b, this thermistor 31 has the composite 10 closer to the resin substrate 27 than it has the metal electrodes 13e and 13f. The exposed portions of the composite 10 and bonding layers 15e and 15f may optionally be protected with a protective film (not illustrated), for example of resin.

Figure 6A:
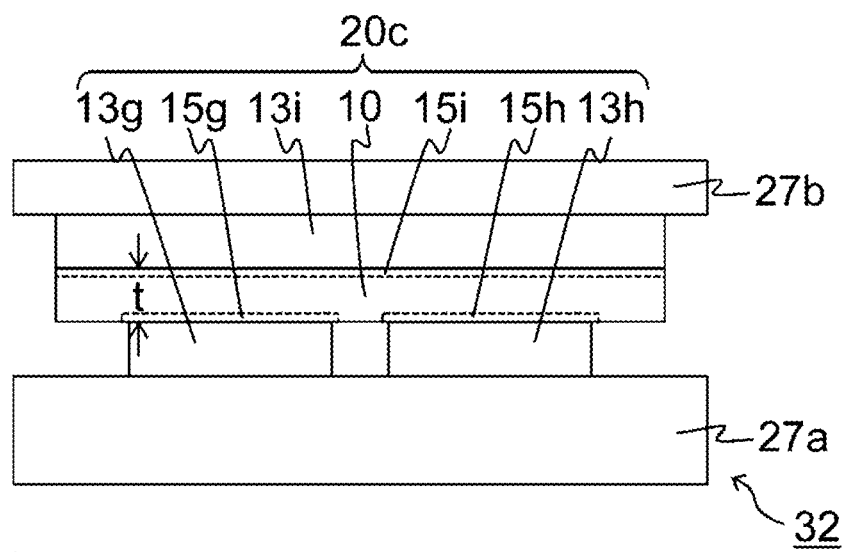
FIGS. 6(a) and 6(b) are diagrams illustrating another example of a thermistor according to an embodiment of the present invention.
Figure 6B:
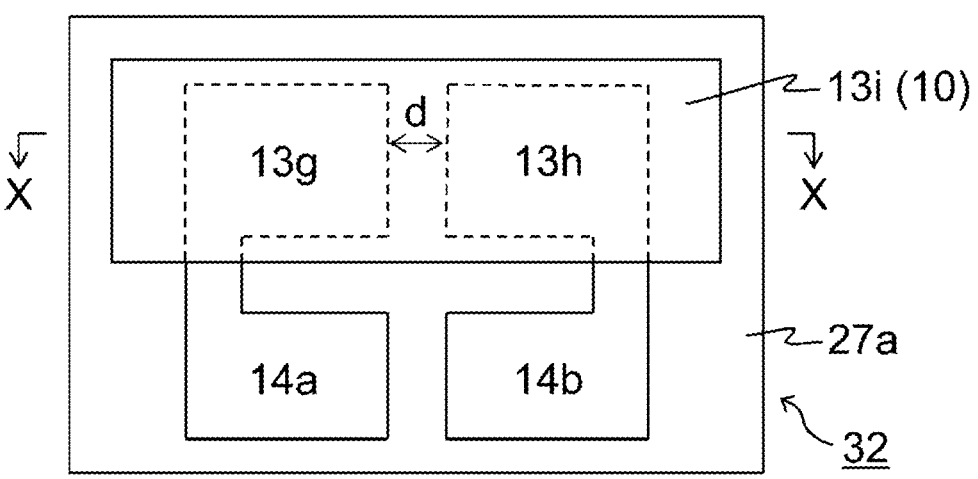

To take another example, as illustrated in FIGS. 6(a) and 6(b), a thermistor 32 may have a pair of metal electrodes 13g and 13i and a pair of a metal electrode 13h and the metal electrode 13i. Each of the metal electrodes 13g and 13i has a primary surface that faces the other's, the composite 10 is interposed between these primary surfaces, and the metal electrodes 13g and 13i are bonded to the composite 10 by bonding layers 15g and 15i, respectively. Likewise, each of the metal electrodes 13g and 13i has a primary surface that faces the other's, the composite 10 is interposed between these primary surfaces, too, and the metal electrodes 13g and 13i are bonded to the composite 10 by a bonding layer 15h and the bonding layer 15i, respectively. In other words, the thermistor 32 has two devices connected in series. The metal component 13 of the structure 20c includes three metal electrodes 13g, 13h, and 13i, and there are bonding layers 15g, 15h, and 15i, respectively, between them and the composite 10. It should be noted that in FIG. 6(b), the thermistor 32 is illustrated excluding the resin substrate 27b, and the metal electrodes 13g and 13h are seen through the components thereabove. Such a configuration allows the manufacturer to control the electrical characteristics of the thermistor 32 (e.g., to further reduce variations in resistance) by controlling the total thickness of the composite 10 and bonding layers 15g and 15i (corresponding to the thickness of the metal oxide composite layer, i.e., the thermistor layer; the symbol "t" in the drawing), thereby helping achieve higher temperature resolution. The metal electrodes 13g and 13h in the illustrated arrangement are electrically coupled to (and/or have been formed one-piece with; the same applies hereinafter) outer electrodes 14a and 14b, but this is not the only possible arrangement. The thermistor 32 in the illustrated arrangement, furthermore, includes resin substrates 27a and 27b, but only one of them suffices.

Figure 7A:
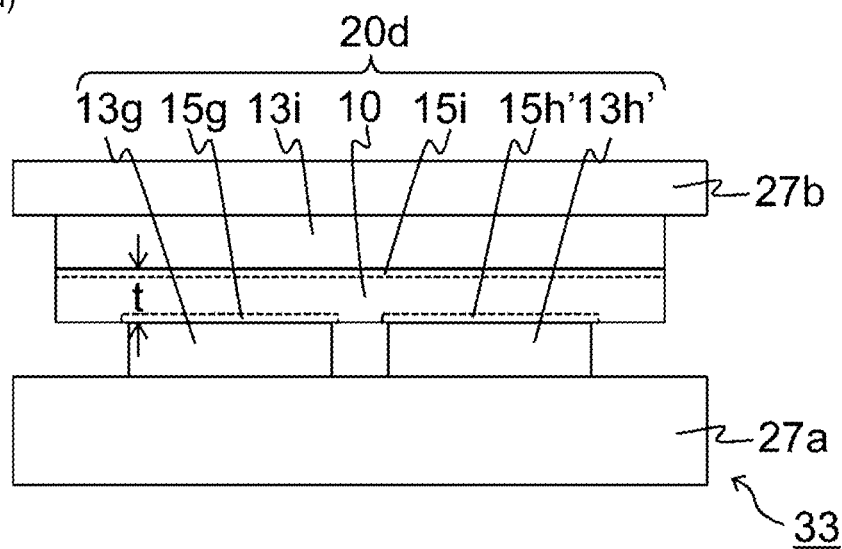
FIGS. 7(a) and 7(b) are diagrams illustrating another example of a thermistor according to an embodiment of the present invention.
Figure 7B:
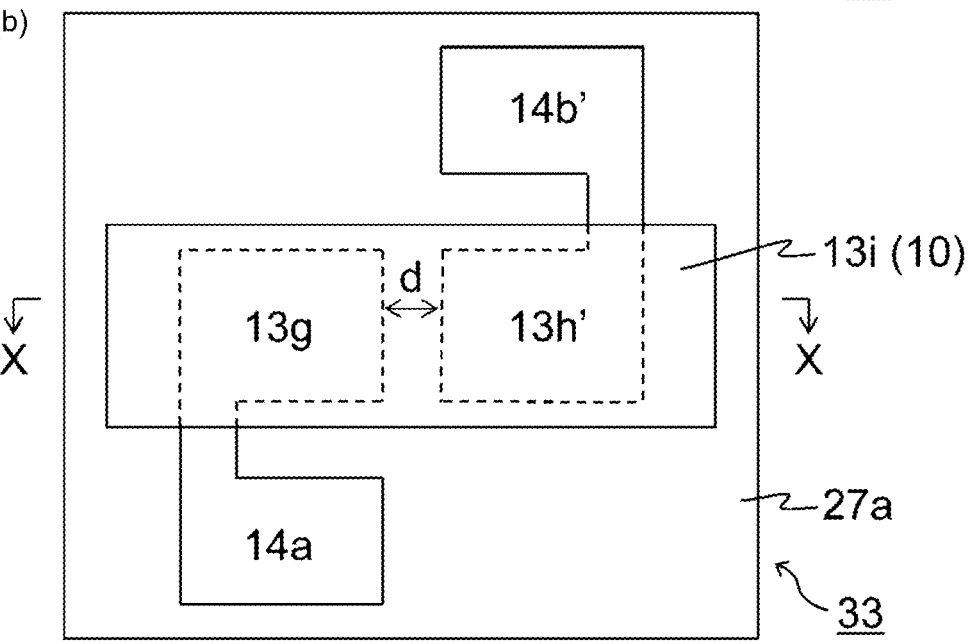

To take another example, as illustrated in FIGS. 7(a) and 7(b), a thermistor 33 may have two metal electrodes 13g and 13h' electrically coupled, respectively (i.e., one-to-one), to two outer electrodes 14a and 14b' that are positioned opposite to each other in a plan view of the thermistor. The metal component 13 of the structure 20d includes three metal electrodes 13g, 13h', and 13i, and there are bonding layers 15g, 15h', and 15i, respectively, between them and the composite 10 (otherwise the thermistor 33 may be the same as the above-described thermistor 32). Such a configuration allows the user to mount the thermistor 33 with relative ease even if the thermistor 33 is extremely small and difficult to handle.

Figure 8A:
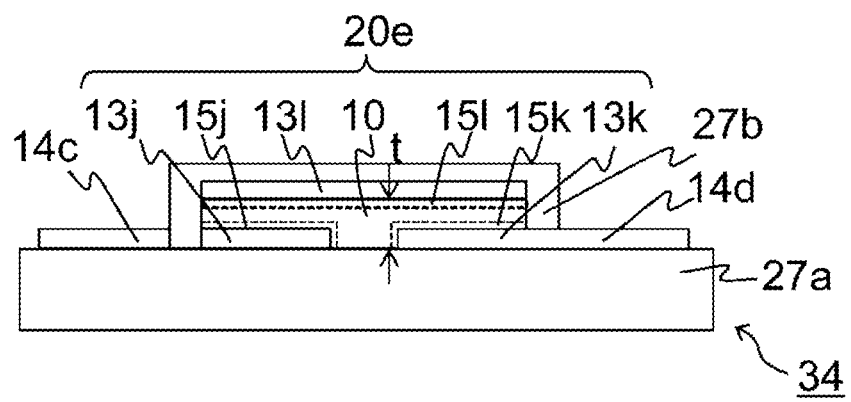
FIGS. 8(a) and 8(b) are diagrams illustrating another example of a thermistor according to an embodiment of the present invention.
Figure 8B:
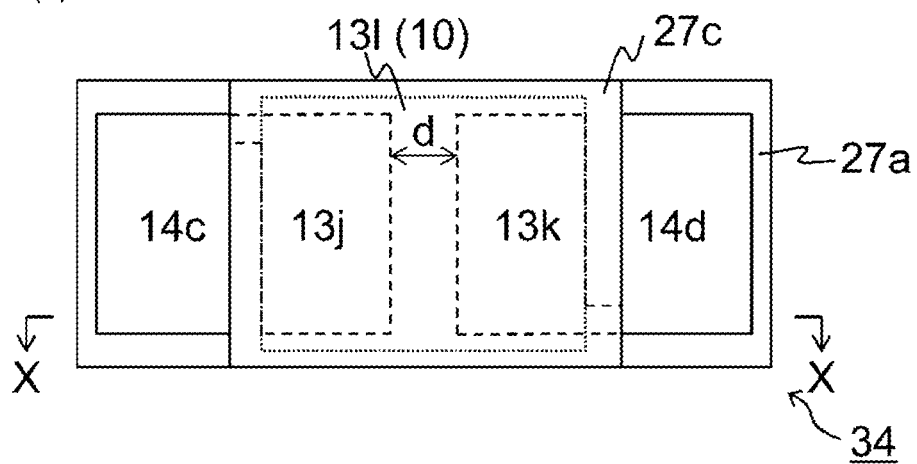

To take another example, as illustrated in FIGS. 8(a) and 8(b), a thermistor 34 may have a pair of metal electrodes 13j and 13l and a pair of a metal electrode 13k and the metal electrode 13l. Each of the metal electrodes 13j and 13l has a primary surface that faces the other's, the composite 10 is interposed between these primary surfaces, and the metal electrodes 13j and 13l are bonded to the composite 10 by bonding layers 15i and 15l, respectively. Likewise, each of the metal electrodes 13k and 13l has a primary surface that faces the other's, the composite 10 is interposed between these primary surfaces, too, and the metal electrodes 13k and 13l are bonded to the composite 10 by a bonding layer 15k and the bonding layer 15l, respectively. In other words, the thermistor 34 has two devices connected in series. The metal component 13 of the structure 20e includes three metal electrodes 13j, 13k, and 13l, and there are bonding layers 15j, 15k, and 15l, respectively, between them and the composite 10. The thermistor 34 may be configured such that two metal electrodes 13j and 13k are electrically coupled, respectively (i.e., one-to-one), to two outer electrodes 14c and 14d that are positioned opposite each other in a plan view of the thermistor. Such a configuration allows the manufacturer to control the electrical characteristics of the thermistor 34 by controlling the thickness of the metal oxide composite layer, thereby helping achieve higher temperature resolution. In addition to this, such a configuration allows the user to mount the thermistor 34 with relative ease.

Figure 9A:
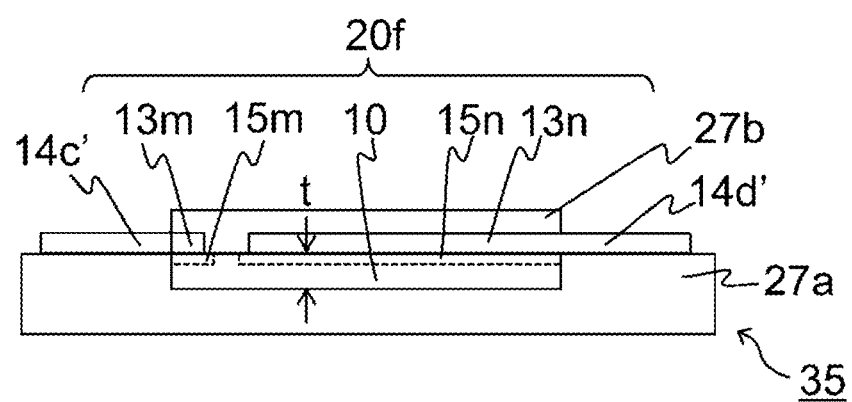
FIGS. 9(a) and 9(b) are diagrams illustrating another example of a thermistor according to an embodiment of the present invention.
Figure 9B:
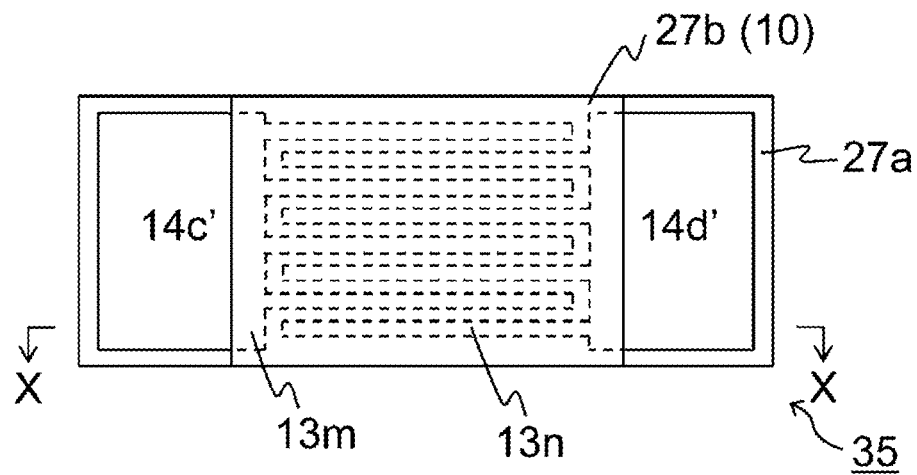

To take another example, as illustrated in FIGS. 9(a) and 9(b), a thermistor 35 may have a pair of opposite and interdigitated metal electrodes 13m and 13n on a single plane. The metal component 13 of the structure 20f includes two metal electrodes 13m and 13n, and there are bonding layers 15m and 15n, respectively, between them and the composite 10. This allows the manufacturer to control the electrical characteristics of the thermistor 35 (e.g., to further reduce variations in resistance), thereby helping achieve higher temperature resolution. The thermistor 35, too, may be configured such that two metal electrodes 13m and 13n are electrically coupled, respectively (i.e., one-to-one), to two outer electrodes 14c' and 14d' that are positioned opposite to each other in a plan view of the thermistor. Such a configuration allows the user to mount the thermistor 35 with relative ease.

In any specific configuration of a thermistor, furthermore, the composite layer and the bonding layer(s) may be, for example, embedded in a resin substrate or in the metal component with part of them exposed out of the substrate or metal component (e.g., see FIGS. 9(a) and 9(b)).

These composite, structures, and thermistors according to this embodiment can be produced by any appropriate method. For example, they can be produced as follows. The following describes a method for producing the thermistor 30, described above with reference to FIGS. 1, 2, 4(a), and 4(b), as an example of how to produce a thermistor. The production of other thermistors can be understood by combining known technologies as necessary, and how to produce a composite and how to produce a structure can be understood by referring only to the relevant portions of the description.

First, metal electrodes 13c and 13d as a metal component 13 are formed on a resin substrate 27. The metal electrodes 13c and 13d can be formed in a pattern by any appropriate process, such as photolithography, plating, deposition, or sputtering.

Then a mixture containing metal oxide particles 1 and at least one metal acetylacetonate (hereinafter also referred to as "feedstock mixture") is applied to a predetermined region of the resin substrate 27 with the metal electrodes 13c and 13d as a metal component 13 formed thereon (the region in which the composite 10 and bonding layers 15c and 15d, or the metal oxide composite layer in other words, is to be formed). By heating the workpiece at a temperature equal to or higher than the melting point of the metal acetylacetonate and equal to or lower than 600° C. under pressure, a composite 10 and bonding layers 15c and 15d are produced simultaneously in the form of a one-piece sintered mass containing the metal oxide particles 1.

The feedstock mixture can be applied to (coated onto, printed on (by screen printing for example), etc.) the predetermined region by a process known to those skilled in the related art, such as coating, dipping, lamination, or spraying. Optionally, the substrate with the feedstock mixture applied thereto is treated, for example by drying at elevated temperature or air-drying. Then the workpiece can be heated at a temperature equal to or higher than the melting point of the metal acetylacetonate and equal to or lower than 600° C. under pressure using means, for example, known to a person skilled in the art, such as a press machine.

As mentioned herein, a metal acetylacetonate is an acetylacetonate salt of a metal, or to be more exact, a chelate complex that has bidentate acetylacetonate ions (($CH_3COCHCOCH_3$)$^-$, which hereinafter can also be denoted by the abbreviation (acac)$^-$) and a central metal. Preferably, the metal element(s) contained in the metal acetylacetonate is any one or two or more elements selected from the first metal elements mentioned above, more preferably metal element(s) of the same kind(s) as the first metal element in the metal oxide particles 1, but these are not the only possibilities.

The metal acetylacetonate may be one metal acetylacetonate or two or more metal acetylacetonates used in combination. If the first metal element in the metal oxide particles 1 is two or more, two or more metal acetylacetonates may be used in combination according to the abundance of these metal elements, but this is not the only possible arrangement.

Mixing metal oxide particles and at least one metal acetylacetonate together gives a feedstock mixture. The mixing together of the metal oxide particles and the metal acetylacetonate can be carried out in an atmosphere at room temperature, ambient humidity, and atmospheric pressure. The metal acetylacetonate may mixed in to make up, for example, 0.1% by mass to 50% by mass of the total mass of the metal oxide particles. Preferably, the metal acetylacetonate is mixed in to make up 1% by mass to 30% by mass, more preferably 2% by mass to 10% by mass, of the total mass of the metal oxide particles.

The metal acetylacetonate to be mixed in can be in any state. For example, the feedstock mixture may be obtained by mixing the metal oxide particles and a dry powder of a solid metal acetylacetonate. In this case, mixing the metal oxide particles and the dry powder of a metal acetylacetonate together, for example under atmospheric pressure, by a common mixing process taking place in one or two or more solvents or one or two or more gases gives the feedstock mixture. The solvent(s) is selected from the group consisting of water, acetylacetone, alcohols including methanol and/or ethanol, etc., and the gas(es) is selected from the group consisting of air, nitrogen, etc.

Alternatively, the feedstock mixture may be obtained by mixing the metal oxide particles, the metal acetylacetonate, and a solvent. The solvent can be any appropriate solvent. For example, it may be one or a mixture of two or more selected from the group consisting of water, acetylacetone, alcohols including methanol and/or ethanol, etc. The solvent content is not critical and only needs not to be unsuitably high for the feedstock mixture to be heated under pressure. For example, the solvent can be mixed in to make up 50% by mass or less, preferably 30% by mass or less, of the total mass of the metal oxide particles. For mixing, the metal acetylacetonate and the solvent may be used separately, or a liquid composed of the solvent and dispersed or dissolved metal acetylacetonate(s) may be used. In the latter case, a liquid in which the metal acetylacetonate has been synthesized may be used without isolating the metal acetylacetonate from it. To be more exact, mixing liquid acetylacetone and metal compound(s) (e.g., hydroxide(s) or chloride(s) of metal(s)) together gives synthesized metal acetylacetonate(s), and the liquid with the synthetic product(s) therein can be used directly or optionally with added solvent.

Besides the metal oxide particles and the metal acetylacetonate, the feedstock mixture may further contain any appropriate material, except to an extent that the desired electrical characteristics would be affected. To be more exact, the feedstock mixture may further contain, for example, additives such as pH-adjusting agents, sintering aids, and pressure buffers. These additives may be mixed in to make up, for example, 0.01% by mass to 10% by mass of the total mass of the metal oxide particles. Preferably, these additives are mixed in to make up 0.01% by mass to 1% by mass, more preferably 0.01% by mass to 0.1% by mass, of the total mass of the metal oxide particles.

Heating the thus-obtained feedstock mixture at a temperature equal to or higher than the melting point of the metal acetylacetonate and equal to or lower than 600° C. under pressure gives a relatively dense sintered mass. In this heating step, the metal acetylacetonate becomes liquid and can function as a liquid medium. Preferably, the heating is carried out in the presence of a fluid. As mentioned herein, a fluid is a liquid for example, preferably a liquid that can be used as a solvent, more preferably water. For example, if the feedstock mixture is heated and pressed in the presence of water, the water will be present in the boundaries between the metal oxide particles contained in the feedstock mixture. The feedstock mixture therefore sinters at lower temperatures, and the sintered mass is also strengthened effectively.

When it is stated herein that a mixture is present with water, the water does not need to have been added to the mixture actively, but the water only needs to be present, even in a small amount, in the boundaries between the metal oxide particles. Even metal oxide particles that have absorbed moisture from the air at room temperature suffice. The active addition of water may be carried out by dampening (mixing) the feedstock mixture with water or may be carried out by heating and pressing the feedstock mixture in a steamy atmosphere. Water present as a result of mixing it into the feedstock mixture is particularly effective in distributing water throughout the boundaries between the particles. If water has been mixed into the feedstock mixture, the water content is not critical. For example, the water content may be 20% by mass or less of the total mass of the metal oxide particles. Preferably, the water content is 15% by mass or less, typically 10% by mass, of the total mass of the metal oxide particles. A water content of the feedstock mixture of 20% by mass or less helps mix water into the feedstock mixture and also helps effectively prevent the water from affecting the shapability of the feedstock mixture. For effective strengthening of the sintered mass, it is preferred to use as much water as possible within the range specified above, or specifically, 10% by mass to 20% by mass water. For easier shaping, it is preferred to use as little water as possible within the range specified above, or specifically, more than 0% by mass and 10% by mass or less water.

The pressure with which the feedstock mixture is pressed may be, for example, 1 MPa to 5000 MPa. Preferably, the pressure is 5 MPa to 1000 MPa, more preferably 10 MPa to 500 MPa. As mentioned herein, pressing a feedstock mixture means applying pressing force (or physical/mechanical pressure) to the feedstock mixture (to be more exact, the solid component of the feedstock mixture), for example using a pressure mold. It should be noted that even while the feedstock mixture is being pressed, therefore, the liquid component of the feedstock mixture remains exposed to pressure from the ambient atmosphere (usually atmospheric pressure).

The temperature at which the feedstock mixture is heated (hereinafter also referred to as "heating temperature") is meant to be firing temperature and can be any temperature equal to or higher than the melting point of the metal acetylacetonate contained in the feedstock mixture and equal to or lower than 600° C. As mentioned herein, a melting point refers to a temperature measured by the test method set forth in the JIS standard at room temperature and atmospheric pressure. Each melting point varies according to conditions, such as the pressure with which the mixture is pressed. The melting points of kinds of metal acetylacetonates are presented in Table 1 below. If two or more metal acetylacetonates are used, "the melting point of the metal acetylacetonate" represents the highest of the melting points of all metal acetylacetonates involved. The heating temperature for the feedstock mixture may be a temperature equal to or higher than the melting point of the metal acetylacetonate plus 5° C. and equal to or lower than 600° C., although it depends on conditions such as the metal oxide used. For example, the heating temperature is 100° C. to 600° C., preferably 100° C. to 400° C., more preferably 100° C. to 300° C.

TABLE 1

| Metal acetylacetonate | Melting point (° C.) |
| --- | --- |
| Manganese acetylacetonate | 161 |
| Nickel acetylacetonate | 230 |
| Iron acetylacetonate | 185 |
| Aluminum acetylacetonate | 193 |
| Cobalt acetylacetonate | 198 |
| Copper acetylacetonate | 284 |

By such a heating of the feedstock mixture at a temperature equal to or higher than the melting point of the metal acetylacetonate under pressure, a relatively dense sintered mass can be formed at a temperature as low as specified above. As mentioned herein, being relatively dense means that the percentage of the actual density of the sintered mass to the theoretical density is higher than would be if the metal oxide particles in the feedstock mixture were heated and pressed under the same temperature and pressure conditions alone (without a metal acetylacetonate). The sintered mass obtained according to this embodiment only needs to be relatively dense, and the percentage of its actual density to the theoretical density can be 70% or more for example, preferably 80% or more, although it depends on conditions such as the composition of the metal oxide particles used. It is fair to deem the metal oxide in the resulting sintered mass substantially identical to that in the metal oxide particles in the feedstock mixture. The duration of heating and pressing of the feedstock mixture can be at the manufacturer's discretion, but preferably is 1 second to 120 minutes.

The sintered mass formed in such a way, in contact with a metal component 13 (in FIGS. 4(a) and 4(b), metal electrodes 13c and 13d) using a feedstock mixture containing metal oxide particles and metal acetylacetonate(s), corresponds, as schematically illustrated in FIGS. 1 and 2, to a composite 10 including metal oxide particles 1 and a first amorphous phase 2 and to a bonding layer 15 including a second amorphous phase 12 (in FIGS. 4(a) and 4(b), bonding layers 15c and 15d). The first amorphous phase 2 will therefore contain metal element(s) derived from the metal acetylacetonate (metal element(s) of the same kind(s) as the first metal element). The second amorphous phase 12, on the other hand, can be entered by the second metal element, which is in the metal component 13 (in FIGS. 4(a) and 4(b), the metal electrodes 13c and 13d), traveling as a result of thermal diffusion. The second amorphous phase 12 will therefore contain metal element(s) derived from the metal component 13 (metal element(s) of the same kind(s) as the second metal element) besides metal element(s) derived from the metal acetylacetonate (metal element(s) of the same kind(s) as the first metal element).

In this way, a thermistor 30 described by way of example in this embodiment is produced. The exposed portions of the composite 10 and bonding layers 15c and 15d may optionally be protected with a protective film (not illustrated), for example of resin.

Embodiment 2

This embodiment is a modified version of a composite, a structure, and a thermistor described above in Embodiment 1. Unless stated otherwise, the same description as in Embodiment 1 applies.

Figure 10A:
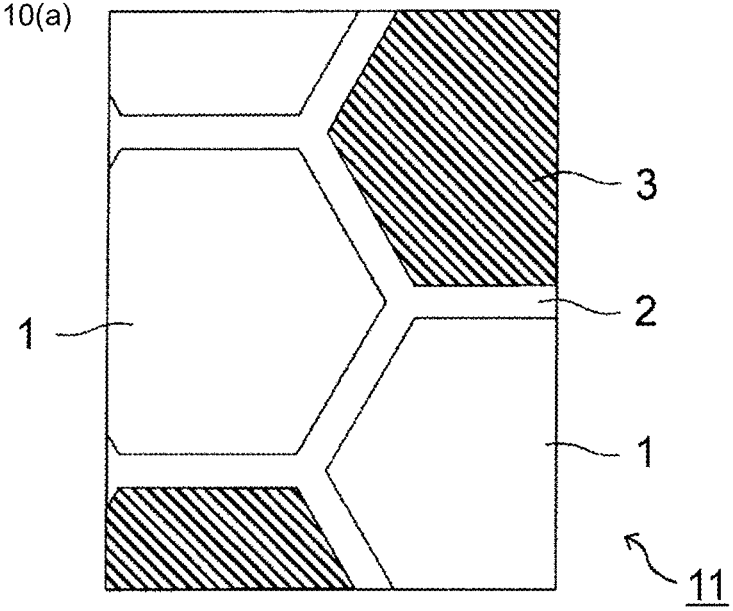
FIG. 10(a) is a partial schematic diagram illustrating the structure of a composite according to another embodiment of the present invention.

As illustrated in FIG. 10(a), a composite 11 according to this embodiment includes: multiple first metal oxide particles 1 containing at least one first metal element (i.e., "metal oxide particles" as described above); a first amorphous phase 2 that contains the first metal element; and multiple first resin particles 3 (hereinafter also referred to simply as "resin particles"). The first amorphous phase 2 is between the multiple first metal oxide particles 1 and the multiple first resin particles 3.

Preferably, the resin forming the first resin particles 3, is a resin(s) that does not easily melt with heat. For example, it can include at least one selected from the group consisting of polyethylene terephthalate, polyetherimide, polyamide-imides, polyimides, polytetrafluoroethylene, epoxy resins, and liquid crystal polymers (LCPs).

The average diameter of the resin particles 3 can be, for example, 0.001 μm to 100 μm, in particular 0.001 μm to 1 μm. If the average diameter is in any such range, the degraded characteristics caused by the added resin have little impact.

The resin particles 3 may be a mixture of two or more kinds of resin particles with different resin materials and/or average diameters.

In this embodiment, the first amorphous phase 2 is between the metal oxide particles 1 and the resin particles 3 (to be more exact, between any particles selected from the metal oxide and resin particles 1 and 3) and can stick particles of the metal oxide and resin particles 1 and 3 together. The composite 11 according to this embodiment, furthermore, achieves stronger bonding between particles by virtue of intermingling of the resin particles 3 with the metal oxide particles 1. As a result, the composite 11 according to this embodiment is stronger in itself. Although with resin particles 3 therein, the composite 11 according to this embodiment is able to contain metal oxide particles 1 relatively densely (able to have electrically conductive paths created by densely dispersed metal oxide particles 1, despite the presence of resin particles 3) owing to the first amorphous phase 2. In addition, the first amorphous phase 2 can exhibit electrical characteristics close to those of the crystalline metal oxide (semiconductor) particles 1. The resulting electrical characteristics are therefore comparable to those of a sintered mass of metal oxide particles produced by the known and commonly used method of sintering at high temperatures.

In this embodiment, the presence of the first amorphous phase 2 between the metal oxide and resin particles 1 and 3 can mean that the space between the multiple metal oxide particles 1 and the multiple resin particles 3 is filled with the first amorphous phase 2. Any void that may be contained in the composite 10 is therefore eliminated by being replaced with multiple resin particles 3 or filled with the first amorphous phase 2, and this helps further reduce the change in resistance that occurs when the composite 11 is left under hot and humid conditions, an event seemingly caused by the presence of voids. When focus is on any adjacent two of all metal oxide particles 1, there may be an amount of first amorphous phase 2 between these two metal oxide particles 1, or, alternatively, the two metal oxide particles 1 may be in contact with (preferably, bound to) each other with substantially no first amorphous phase 2 therebetween. In the former case, the first amorphous phase 2 can have a thickness of 100 μm or less. For electrical characteristics and/or strength purposes, smaller thickness of the first amorphous phase 2 is preferred. In the latter of these cases, the composite 11 may have a portion substantially free of first amorphous phase 2.

Figure 10B:
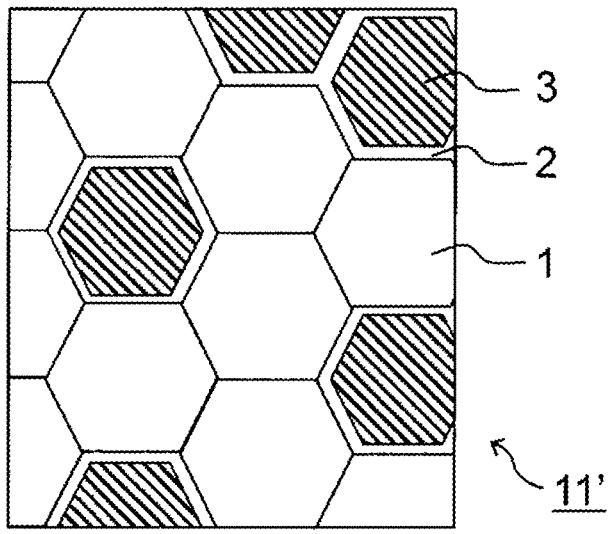
FIG. 10(b) illustrates a modified version of the composite in FIG. 10(a).

Preferably, the composite 11 according to this embodiment is in a modified form like the composite 11' illustrated in FIG. 10(b). The composite 11' illustrated in FIG. 10(b) includes: multiple first metal oxide particles 1 containing at least one first metal element (i.e., "metal oxide particles" as described above); a first amorphous phase 2 that contains the first metal element; and multiple first resin particles 3 (hereinafter also referred to simply as "resin particles"). The multiple first metal oxide particles are in direct contact with each other, the first resin particles 3 are inside the multiple first metal oxide particles 1 that are in direct contact with each other, and the first amorphous phase 2 is between the multiple first metal oxide particles 1 that are in direct contact with each other and the first resin particles. In such a modified composite 11', the multiple first metal oxide particles 1 are all in contact with one another (preferably bound to one another, more preferably forming one single mass) with substantially no first amorphous phase 2 therebetween. The inventor believes this structure is ideal and promises better electrical characteristics and/or higher strength.

The following description about the composite 11 also applies to such a modified composite 11'.

The percentage of the resin particles 3 in the composite 11 (to the total mass of the composite) is 50% by mass or less, for example, and may be 5% by mass to 20% by mass to be more exact. If this percentage is in any such range, the degraded characteristics caused by the added resin have little impact, while high strength is achieved.

The composite 11 according to this embodiment is able to be part of a structure by being placed (formed as a film in particular) on any physical object. Although not limiting this embodiment, the composite 11 can be bonded at least in part to a metal component (e.g., a structural element, region of something, etc., made of metal).

Figure 11:
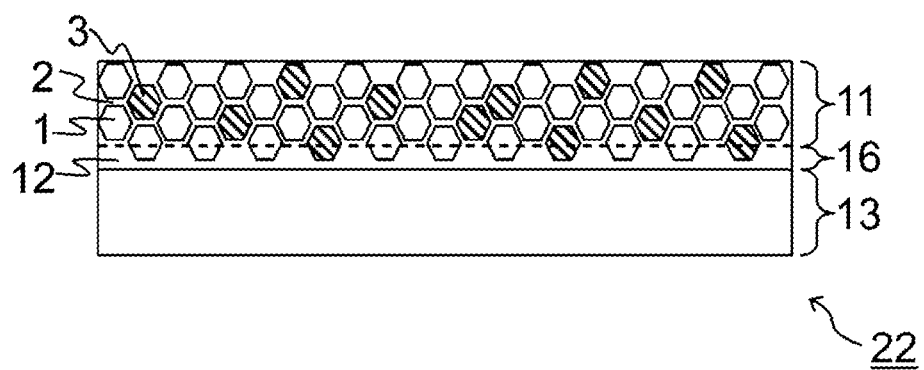
FIG. 11 is a schematic cross-sectional diagram illustrating an example of a structure according to another embodiment of the present invention.

For example, as illustrated in FIG. 11, a structure 22 according to an example of this embodiment includes: a metal component 13 that contains at least one second metal element; a composite 11 according to this embodiment as described above; and a bonding layer 16 between the metal component 13 and the composite 11. The bonding layer 16 includes a second amorphous phase 12 that contains the first and second metal elements.

Figure 12:
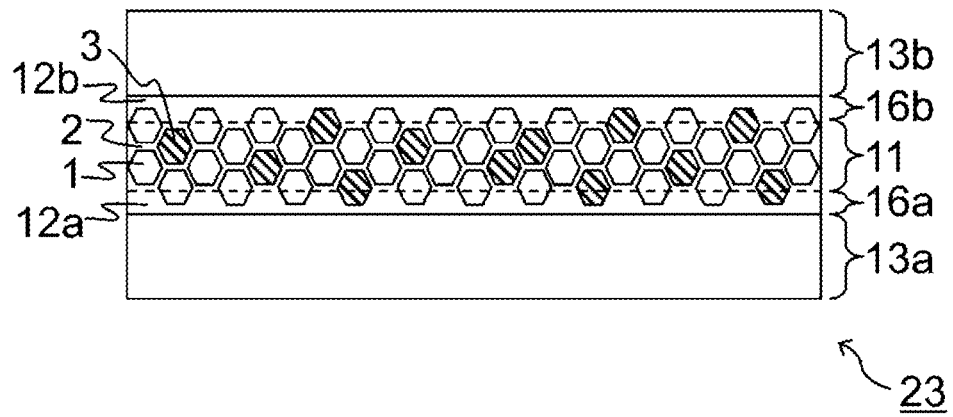
FIG. 12 is a schematic cross-sectional diagram illustrating another example of a structure according to another embodiment of the present invention.

As illustrated in FIG. 12, a structure 23 according to another example of this embodiment may have a composite 11 according to this embodiment as described above bonded to metal components 13a and 13b by bonding layers 16a and 16b, respectively, interposed therebetween. The bonding layers 16a and 16 include second amorphous phases 12a and 12b, respectively, that contain the first and second metal elements.

The structures 22 and 23 according to this embodiment can be the same as the structures described above in Embodiment 1 except that there are resin particles 3 besides the metal oxide particles 1.

The structures 22 and 23 according to this embodiment are able to be part of a thermistor by being placed on any substrate, optionally with modifications. Although not limiting this embodiment, the structures 22 and 23 can be placed on a resin substrate (or resin film), optionally with modifications. Thermistors according to this embodiment can also be the same as the thermistors described above in Embodiment 1 except that there are resin particles 3 besides the metal oxide particles 1.

These composites, structures, and thermistors according to this embodiment can be produced by any appropriate method. For example, they can be produced in the same way as in the production method described above in Embodiment 1 except that the feedstock mixture was a mixture containing metal oxide particles 1, resin particles 3, and at least one metal acetylacetonate.

The foregoing is a description of composites, and structures and thermistors made using a composite, according to two embodiments of the present invention. The present invention, however, is not limited to these embodiments.

EXAMPLES

Example 1

This example relates to the structure described with reference to FIG. 3 in Embodiment 1.

Metal oxide particles with an average diameter of approximately 0.2 μm containing Mn:Ni:Al in 4:1:1 proportions (atomic ratio) were mixed with 10% by mass (to the total mass of the metal oxide particles) manganese acetylacetonate to give a feedstock mixture, with ethanol as solvent. The resulting feedstock mixture was mixed for 16 hours. The resulting slurry of the feedstock mixture was fed onto a piece of 30-μm thick copper foil (lower electrode) by doctor blading to form a 10-μm thick sheet. This sheet was dried at 100° C. for 10 hours, and the dried sheet was heated at 150° C. for 30 minutes under a pressure of 100 MPa using a heat press. The sheet-derived film (metal oxide composite layer) was then covered with another piece of 30-μm thick copper foil (upper electrode), and the resulting stack was heated at 250° C. for 30 minutes under a pressure of 100 MPa, using the heat press once again, to give a precursor structure. This precursor structure was annealed at 250° C. for 10 hours to remove any unnecessary organic substances that could remain. In this way, a structure of this example (a structure composed of two pieces of copper film and a metal oxide composite layer that could function as the thermistor layer sandwiched therebetween; total thickness, approximately 70 μm) was obtained.

The resulting structure of this example was tested for bonding strength (adhesiveness). The test was carried out according to the cross-cut test set forth in JIS K5600-5-6. Test results are classified as follows.
- 0: The edges of the cuts are completely smooth; none of the squares of the lattice is detached.
- 1: Detachment of small flakes of the coating at the intersections of the cuts. A cross-cut area not greater than 5% is affected.
- 2: The coating has flaked along the edges and/or at the intersections of the cuts. A cross-cut area greater than 5%, but not greater than 15%, is affected.
- 3: The coating has flaked along the edges of the cuts partly or wholly in large ribbons, and/or it has flaked partly or wholly on different parts of the squares. A cross-cut area greater than 15%, but not greater than 35%, is affected.
- 4: The coating has flaked along the edges of the cuts in large ribbons and/or some squares have detached partly or wholly. A cross-cut area greater than 35%, but not greater than 65%, is affected.
- 5: Any degree of flaking that cannot even be classified by classification 4.

The test result for bonding strength (adhesiveness) of the structure of this example was classification 1. Specifically, only a minor degree of detachment was observed between the upper electrode and the metal oxide composite layer.

The structure of this example was then tested for electrical characteristics. To be more exact, the structure was cut using a dicing saw into a die sized to dimensions of 5 mm×10 mm in a plan view and 70 μm thick. The resistance of this die was measured by two-terminal sensing at 25° C., 50° C., and 75° C., and the measured resistance values were used to calculate resistivity at room temperature (25° C.) and the B-constant. The resistivity at room temperature was 100 kΩcm, and the B-constant was 4500.

The measured electrical characteristics of the structure of this example were substantially consistent with those of a sample prepared by sintering the metal oxide particles used in the feedstock mixture through heating at 900° C. and atmospheric pressure for 120 minutes and forming Ag electrodes on the sintered bulk by sputtering. The structure of this example, therefore, was found to have experienced substantially no increase in resistance at the boundaries between the metal oxide particles and/or the interfaces of the metal oxide particles with the electrodes.

A sample (the aforementioned die) of this example was then left under temperature-controlled and humid conditions, a temperature of 60° C. and a humidity of 95%, for 24 hours, and then its resistance was measured once again. The percentage change from the resistance measured at 25° C. was 0.3%.

Figure 13A:
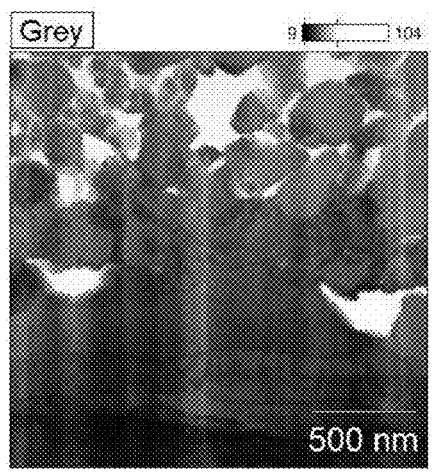
FIGS. 13(a) to 13(d) are scanning transmission electron microscope (STEM) images (light-field) of part of a cross-section of a structure produced in Example 1 of the present invention.
Figure 13B:
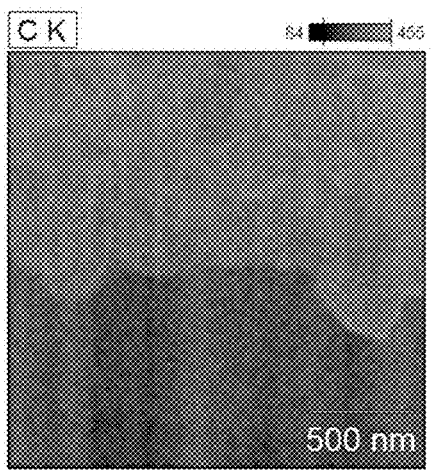
Figure 13C:
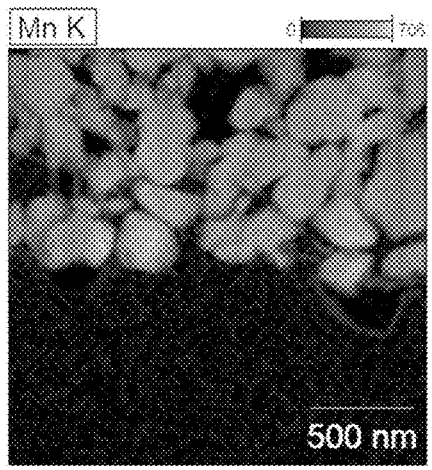
Figure 13D:
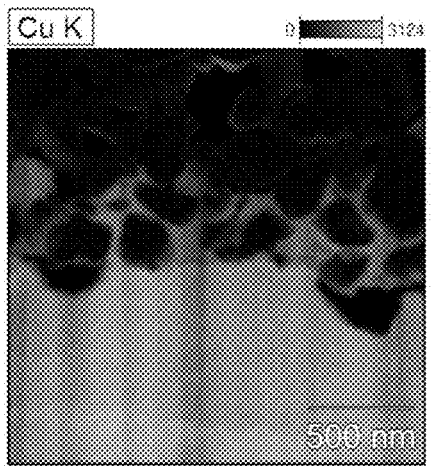

Then the structure of this example was subjected to scanning transmission electron microscope (STEM) imaging (light-field) of part of its cross-section. The results are presented in FIGS. 13(a) to 13(d). FIG. 13(a) is a STEM image of a cross-section of the joint between the metal oxide composite layer and the lower electrode of the structure of Example 1, including the vicinity of the joint. FIG. 13(b) presents the elemental distribution of C (carbon) in FIG. 13(a). FIG. 13(c) presents the elemental distribution of Mn (manganese) in FIG. 13(a). FIG. 13(d) presents the elemental distribution of Cu (copper) in FIG. 13(a). As is understood from FIGS. 13(a) to 13(d), in the body of the metal oxide composite layer (portion excluding the vicinity of the interfaces with the upper and lower electrodes), the boundaries of multiple metal oxide particles were in contact with the first amorphous phase, forming a composite of metal oxide particles and a first amorphous phase sticking them together. FIGS. 13(a) to 13(d) also demonstrate that a composite of metal oxide particles and a second amorphous phase was formed as a bonding layer at the joint between the metal oxide composite layer and the lower electrode. The second amorphous phase was found to contain the metal element Cu derived from the metal component besides Mn as a metal element derived from the metal oxide particles or from the metal acetylacetonate.

These measured electrical characteristics and STEM observations suggest that the first and second amorphous phases have electrical characteristics close to those of the metal oxide (semiconductor) particles. The inventor believes this is why the structure of this example achieved, as mentioned above, electrical characteristics comparable to a bulk sintered at 900° C. with substantially no increase in resistance at the boundaries between the metal oxide particles and/or the interfaces of the metal oxide particles with the electrodes.

Figure 15A:
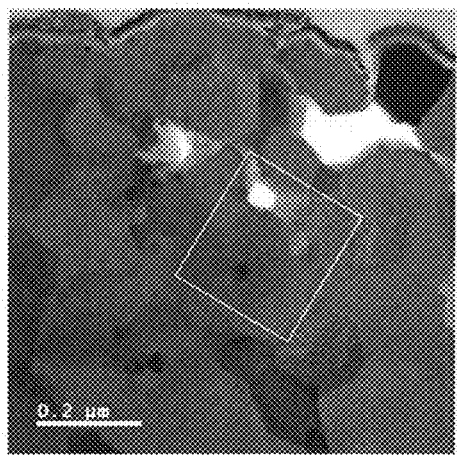
FIGS. 15(a) to 15(d) are transmission electron microscope (TEM) images of part of a cross-section of a structure produced in Example 1 of the present invention.
Figure 15B:
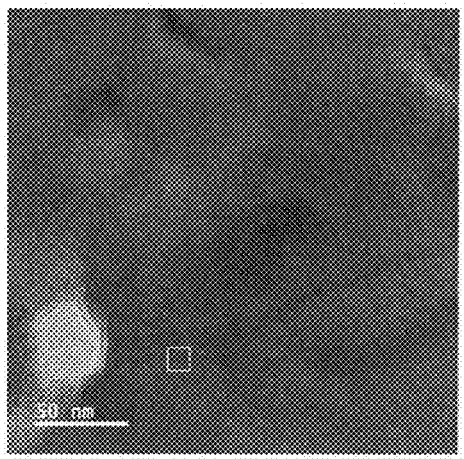
Figure 15C:
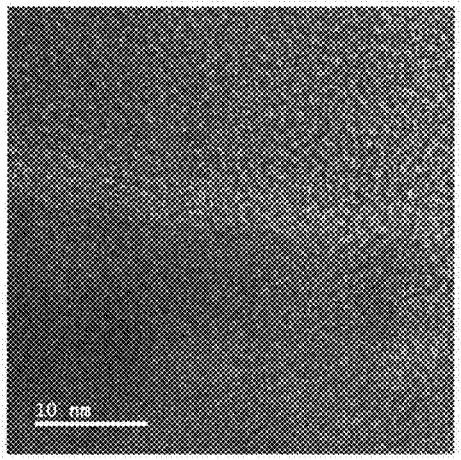
Figure 15D:
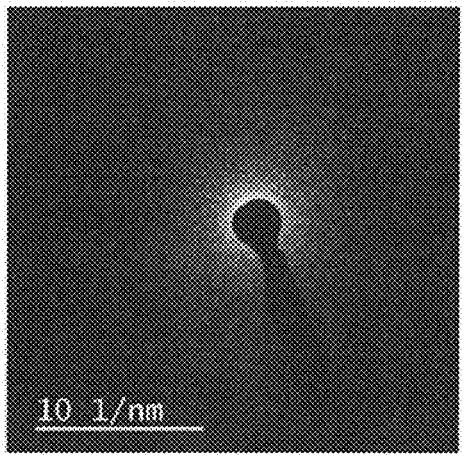

The structure of this example was also subjected to transmission electron microscope (TEM) imaging of part of another cross-section. The results are presented in FIGS. 15(a) to 15(c). Referring to FIGS. 15(a) to 15(c), no first amorphous phase was observed between the metal oxide particles (first particles) at this site. Electron-beam diffraction patterns, a technique known to those skilled in the art, were used to determine whether an amorphous phase was present. If there is no lattice fringe as in FIG. 15(c), the absence of diffraction spots (dots), presented in FIG. 15(d) by way of example, means that an amorphous phase is present there. In the measuring point in FIGS. 15(a) to 15(c), no amorphous phase was observed with a thickness of 0.01 μm or more, indicating that the first amorphous phase may be totally absent at some locations in the composite.

Examples 2 and 3

These examples relate to the structure described with reference to FIG. 12 in Embodiment 2.

The feedstock mixture was prepared with an extra ingredient, 10% by mass (to the total mass of the metal oxide particles) polyimide precursor solution (Example 2) or polyamide-imide precursor solution (Example 3). Except for this, structures were obtained in the same way as in Example 1.

The resulting structures of these examples were tested for bonding strength (adhesiveness) and electrical characteristics in the same way as in Example 1.

The test results for bonding strength (adhesiveness) of the structures of these examples were both classification 0. Specifically, no detachment was observed between the upper electrode and the metal oxide composite layer, and so was between the lower electrode and the metal oxide composite layer.

The measured electrical characteristics of such structures of these examples were comparable to those of the structure of Example 1. Samples of such structures of these examples were then left under temperature-controlled and humid conditions, a temperature of 60° C. and a humidity of 95%, for 24 hours, and then their resistance was measured once again. The percentage change from the resistance measured at 25° C. was 0.1%.

Figure 14A:
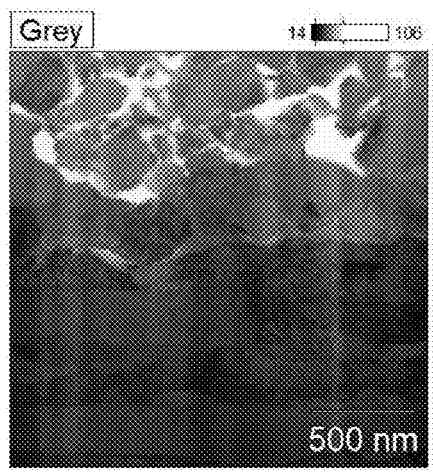
FIGS. 14(a) to 14(d) are scanning transmission electron microscope (STEM) images (light-field) of part of a cross-section of a structure produced in Example 3 of the present invention.
Figure 14B:
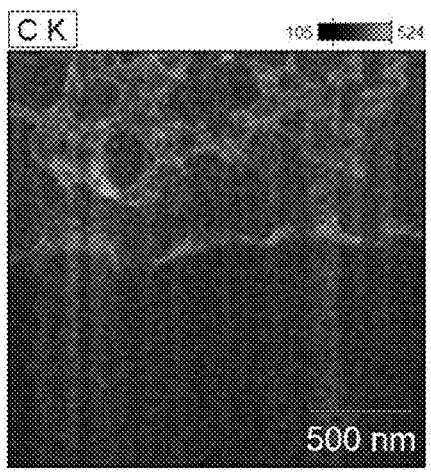
Figure 14C:
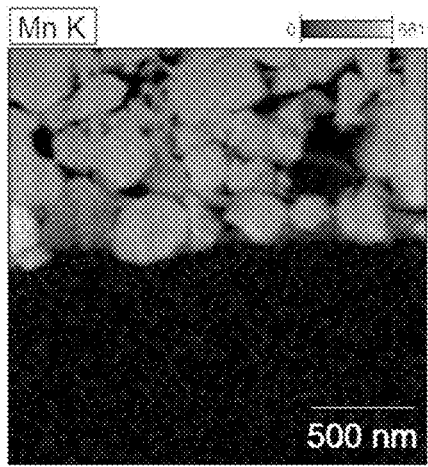
Figure 14D:
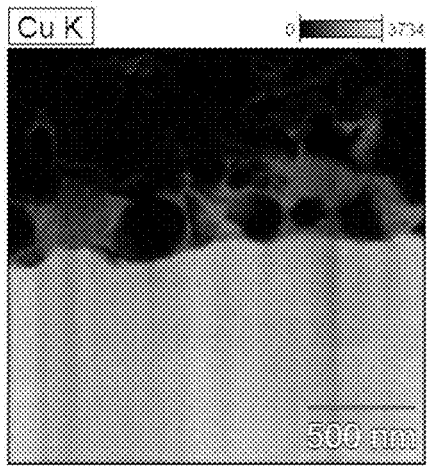

Then the structure of Example 3 was subjected to scanning transmission electron microscope (STEM) imaging (light-field) of part of its cross-section. The results are presented in FIGS. 14(a) to 14(d). A striking difference of FIGS. 14(a) to 14(d) from FIGS. 13(a) to 13(d) is the distribution of C, presented in FIG. 14 (b). In FIG. 13(b), C was found dispersed almost uniformly in the metal oxide composite layer. This, the inventor believes, is because carbon components associated with sample machining or measurement were detected. In FIG. 14(b), much C was observed in the regions in which no metal oxide particles were present, demonstrating that the polyamide-imide precursor solution added had segregated itself into polyamide-imide resin particles.

It is therefore understood that in Examples 2 and 3, resin particles are formed during the heating under pressure. It is also understood that the average diameter of such resin particles is considerably smaller than that of the metal oxide particles.

Example 4

This example relates to the thermistor described with reference to FIG. 5 in Embodiment 1.

Metal oxide particles with an average diameter of approximately 0.2 μm containing Mn:Ni:Al in 4:1:1 proportions (atomic ratio) were mixed with 10% by mass (to the total mass of the metal oxide particles) manganese acetylacetonate to give a feedstock mixture, with ethanol as solvent. The resulting feedstock mixture was mixed for 16 hours. The resulting slurry of the feedstock mixture was fed onto a piece of 10-μm thick copper foil by doctor blading to form a 10-μm thick sheet. This sheet was dried at 100° C. for 10 hours, and the dried sheet was heated at 250° C. for 30 minutes under a pressure of 100 MPa using a heat press to give a precursor structure. This precursor structure was annealed at 250° C. for 10 hours to remove any unnecessary organic substances that could remain, giving a structure. Then, of the components of the structure, the sheet-derived film (metal oxide composite layer that could function as the thermistor layer) was coated with a polyamide-imide precursor solution to a thickness of 10 μm. The polyamide-imide was thermally cured by heating the coating at 200° C. for 1 hour, giving a resin substrate. Then the surface of the copper foil opposite the resin substrate was coated with a resist in a predetermined pattern, the resist was exposed to light and developed, a predetermined portion of the copper foil was removed by etching, and the remaining resist was removed to form two copper electrodes. These copper electrodes had dimensions of 2.5 mm×2.5 mm in a plan view and were arranged in parallel with a distance of 100 μm (symbol "d" in FIG. 5) therebetween. Then the structure was cut using a dicing saw. In this way, a thermistor sized to dimensions of 5 mm×15 mm in a plan view was obtained (see FIG. 5).

For the electrical characteristics of the thermistor of this example, the user can know temperature (and its change) from the resistance (and its change) between two electrodes present on the same surface of a metal oxide composite layer (thermistor layer). To the resistance of this thermistor, both the distance d between the electrodes and the thickness t of the metal oxide composite layer contribute. If the manufacturer wants to achieve high temperature resolution, the inventor believes the key is to further reduce variations in the resistance of the thermistor and make them smaller than a particular limit. The variations in the distance d between the electrodes can be reduced by, for example, using inter-digitated electrodes.

Example 5

This example relates to the thermistor described with reference to FIG. 6 in Embodiment 1.

An average diameter of approximately 0.2 μm containing Mn:Ni:Al in 4:1:1 proportions (atomic ratio) were mixed with 10% by mass (to the total mass of the metal oxide particles) manganese acetylacetonate to give a feedstock mixture, with ethanol as solvent. The resulting feedstock mixture was mixed for 16 hours. The resulting slurry of the feedstock mixture was fed onto a piece of 10-μm thick copper foil by doctor blading to form a 10-μm thick sheet. This sheet was dried at 100° C. for 10 hours, and the dried sheet was heated at 150° C. for 30 minutes under a pressure of 100 MPa using a heat press to give a multilayer body. The resulting multilayer body was cut using a dicing saw to give a first multilayer body sized to dimensions of 5 mm×5 mm in a plan view. Separately, a second multilayer body was prepared as a 20-μm thick polyimide film patterned with a 10-μm thick copper layer thereon. The first and second multilayer bodies were put on top of each other with the sheet-derived film (metal oxide composite layer that could function as the thermistor layer) of the first multilayer body and the copper layer of the second multilayer body facing each other properly, and this stack was heated at 250° C. for 30 minutes under a pressure of 100 MPa using a heat press to give a precursor structure. This precursor structure was annealed at 250° C. for 10 hours to remove any unnecessary organic substances that could remain, giving a structure. Then, of the components of the structure, the surface of the copper foil in the multilayer body was covered with a 10-μm thick polyimide film, and the polyimide film was thermally cured to give a multilayer structure. This multilayer structure was then cut using a dicing saw. In this way, a thermistor sized to dimensions of 5 mm×15 mm in a plan view was obtained (see FIG. 6).

For the electrical characteristics of the thermistor of this example, the user can know temperature (and its change) from the resistance (and its change) between two electrodes opposite each other with a metal oxide composite layer (thermistor layer) therebetween (the resistance can be a total of the resistance between the metal electrodes 13g and 13i and that between the metal electrodes 13i and 13h in FIG. 6). To the resistance of this thermistor, the area of overlap between the electrodes and the thickness t of the metal oxide composite layer contribute. When the thermistor of this example is compared with that of Example 4, the thermistor of this example is different from that of Example 4 in what contributes to the resistance of the thermistor. Whereas the thermistor of Example 4 has the distance between electrodes as a contributing factor, that of this example has the area of overlap between electrodes instead. Variations in the distance between electrodes can be reduced by, for example, using interdigitated electrodes, but variations in the area of overlap between electrodes are easier to reduce in the production process. This means the thermistor of this example can be produced with reduced variations in its resistance even more easily than that of Example 4.

Comparative Example 1

Thin-film thermistors corresponding to a structure described in Patent Document 1 were fabricated.

A $SiO_2$ film was formed on a Si wafer by thermal oxidation, and a Pt electrode layer containing oxygen or nitrogen was formed on it by sputtering. Electrodes were formed by etching the electrode layer into a predetermined pattern, and a metal oxide film (thermistor layer) was formed on it by sputtering with a metal oxide having the same composition as the metal oxide particles used in the feedstock mixture in Example 1. In this way, thin-film thermistors were fabricated.

When such structures of this comparative example, obtained as described above, were tested for bonding strength (adhesiveness) in the same way as in Example 1, the test result was classification 3. Specifically, detachment was observed between the electrodes and the metal oxide film.

Comparative Example 2

Thin-film thermistors corresponding to a structure described in Patent Document 2 were fabricated.

An $SiO_2$ film was formed on a Si wafer by thermal oxidation, and a Pt/Ti or Cr electrode layer was formed on it by sputtering. Electrodes were formed by etching the electrode layer into a predetermined pattern, and a metal oxide film (thermistor layer) was formed on it by sputtering with a metal oxide having the same composition as the metal oxide particles used in the feedstock mixture in Example 1. In this way, thin-film thermistors were fabricated.

When such structures of this comparative example, obtained as described above, were tested for bonding strength (adhesiveness) in the same way as in Example 1, the test result was classification 3. Specifically, detachment was observed between the electrodes and the metal oxide film.

The composite and structure according to the present invention can be incorporated into a thermistor, and the thermistor according to the present invention can be used in a wide variety of applications, such as temperature sensors. If the thermistor according to the present invention is made flexible as a whole, it can be used as a flexible temperature sensor, for example in applications from automotive batteries, about which researchers are confronting the problems of spontaneous ignition and degradation at high temperatures, to temperature measurement for controlling the temperature of a smartphone battery and body temperature measurement in the fields of medicine and healthcare. This embodiment, however, is not limited to such applications.

REFERENCE SIGNS LIST

1 First particles (metal oxide particles)
2 First amorphous phase
3 Second particles (resin particles)
10, 11, 11' Composite
12, 12a, 12b Second amorphous phase
13, 13a, 13b Metal component
13c to 13n Metal electrode
14a to 14d' Outer electrode
15, 15a to 15n Bonding layer
16, 16a, 16b Bonding layer
20, 20a to 20f, 21, 22, 23 Structure
27, 27a, 27b Resin substrate
30 to 35 Thermistor

The invention claimed is:

1. A composite comprising:
   a plurality of first metal oxide particles containing at least one first metal element that is at least one of Mn or Ni; and
   a first amorphous phase between the plurality of first metal oxide particles and contains the at least one first metal element.

2. The composite according to claim 1, wherein the first metal element further includes at least one selected from the group consisting of Fe, Al, Co, and Cu.

3. The composite according to claim 1, further comprising a plurality of first resin particles, and wherein the first amorphous phase is between the plurality of first metal oxide particles and the plurality of first resin particles.

4. The composite according to claim 3, wherein the plurality of first resin particles comprise at least one selected from the group consisting of polyethylene terephthalate, polyetherimide, polyamide-imides, polyimides, polytetrafluoroethylene, epoxy resins, and liquid crystal polymers.

5. The composite according to claim 1, wherein the first amorphous phase has a thickness of 100 μm or less.

6. The composite according to claim 1, wherein at least some of the plurality of first metal oxide particles are in direct contact with each other.

7. A structure comprising:
   a metal component that contains at least one second metal element;
   the composite according to claim 1; and
   a bonding layer between the metal component and the composite, wherein
   the bonding layer includes a second amorphous phase that contains the at least one first metal element and the at least one second metal element.

8. The structure according to claim 7, wherein the second metal element includes at least one selected from the group consisting of Mn, Ni, Fe, Al, Zn, Cr, Ti, Co, Cu, Ag, Au, and Pt.

9. A thermistor comprising:
   a resin substrate made of at least one second resin; and
   the structure according to claim 7 on the resin substrate, wherein
   the metal component includes two metal electrodes.

10. The thermistor according to claim 9, wherein the composite and the bonding layer have a combined thickness of 100 μm or less.

11. The thermistor according to claim 9, wherein the second resin includes at least one selected from the group consisting of polyethylene terephthalate, polyetherimide, polyamide-imides, polyimides, polytetrafluoroethylene, epoxy resins, and liquid crystal polymers.

12. The thermistor according to claim 9, wherein each of the two metal electrodes have a respective primary surface that face each other, and the composite is interposed between the respective primary surfaces of the two metal electrodes.

13. The thermistor according to claim 9, wherein the two metal electrodes are electrically coupled, respectively, to two outer electrodes that are positioned opposite to each other in a plan view of the thermistor.

14. A composite comprising:
a plurality of first metal oxide particles that are in direct contact with each other and defining an opening, the plurality of first metal oxide particles containing at least one first metal element that is at least one of Mn or Ni;
at least one first resin particle inside the opening defined by the plurality of first metal oxide particles that are in direct contact with each other; and
a first amorphous phase between the plurality of first metal oxide particles that are in direct contact with each other and the at least one first resin particles, the first amorphous phase containing the at least one first metal element.

15. The composite according to claim 14, wherein the first metal element further includes at least one selected from the group consisting of Fe, Al, Co, and Cu.

16. The composite according to claim 14, wherein the at least one first resin particles comprise at least one selected from the group consisting of polyethylene terephthalate, polyetherimide, polyamide-imides, polyimides, polytetrafluoroethylene, epoxy resins, and liquid crystal polymers.

17. The composite according to claim 14, wherein the first amorphous phase has a thickness of 100 µm or less.

18. A structure comprising:
a metal component that contains at least one second metal element;
the composite according to claim 14, and
a bonding layer between the metal component and the composite, wherein
the bonding layer includes a second amorphous phase that contains the at least one first metal element and the at least one second metal element.

19. The structure according to claim 18, wherein the second metal element includes at least one selected from the group consisting of Mn, Ni, Fe, Al, Zn, Cr, Ti, Co, Cu, Ag, Au, and Pt.

20. A thermistor comprising:
a resin substrate made of at least one second resin; and
the structure according to claim 18 on the resin substrate, wherein
the metal component includes two metal electrodes.

* * * * *